US009690351B2

(12) United States Patent
Liao et al.

(10) Patent No.: US 9,690,351 B2
(45) Date of Patent: Jun. 27, 2017

(54) POWER CONTROL SYSTEM AND METHOD THEREOF

(71) Applicant: GIGA-BYTE TECHNOLOGY CO., LTD., New Taipei (TW)

(72) Inventors: Tse Hsine Liao, New Taipei (TW); Chih Wei Huang, New Taipei (TW); Chih Hua Ke, New Taipei (TW); Hung Cheng Chen, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 265 days.

(21) Appl. No.: 14/139,242

(22) Filed: Dec. 23, 2013

(65) Prior Publication Data

US 2015/0012762 A1  Jan. 8, 2015

(30) Foreign Application Priority Data

Jul. 5, 2013 (TW) .............................. 102124273 A

(51) Int. Cl.
*G06F 1/32* (2006.01)
*G06F 1/20* (2006.01)
*G06F 1/26* (2006.01)

(52) U.S. Cl.
CPC .............. *G06F 1/3203* (2013.01); *G06F 1/20* (2013.01); *G06F 1/26* (2013.01); *G06F 1/3206* (2013.01)

(58) Field of Classification Search
None
See application file for complete search history.

(56) References Cited

U.S. PATENT DOCUMENTS

2007/0047338 A1* 3/2007 Chou ....................... G06F 1/26
                                                              365/194
2008/0004755 A1  1/2008 Dunstan
(Continued)

FOREIGN PATENT DOCUMENTS

CN        1716190          1/2006
CN        2893773 Y    *   4/2007
(Continued)

OTHER PUBLICATIONS

Machine Translation of CN 2893773 Y.*
"Office Action of China Counterpart Application", issued on Jun. 20, 2016, p. 1-p. 10.

*Primary Examiner* — Kim Huynh
*Assistant Examiner* — Paul J Yen
(74) *Attorney, Agent, or Firm* — Jianq Chyun IP Office

(57) ABSTRACT

A power control system and a power control method thereof applied to a computer device are provided. The computer device includes a computer system and a power system. The power system includes a plurality of voltage regulators for providing supply voltages to the components of the computer device. The power control system is coupled to the computer system and the power system and includes an overclocking frequency mode. When the computer system receives an OFF signal and enters a non-operating mode, and when the power control system is in the overclocking frequency mode, the power control system sends a SYSTEM-SHUTDOWN signal to the computer system to control the power system to enter the non-operating mode and to control the power system to keep outputting supply voltages.

10 Claims, 8 Drawing Sheets

(56) References Cited

U.S. PATENT DOCUMENTS

| | | | | |
|---|---|---|---|---|
| 2009/0235108 A1* | 9/2009 | Gold | .................... | G06F 1/206 |
| | | | | 713/500 |
| 2010/0223489 A1* | 9/2010 | Huang | .................... | G06F 1/08 |
| | | | | 713/501 |
| 2011/0131427 A1 | 6/2011 | Jorgenson et al. | | |
| 2011/0161706 A1* | 6/2011 | Huang | .................... | G06F 1/08 |
| | | | | 713/323 |

FOREIGN PATENT DOCUMENTS

| | | |
|---|---|---|
| CN | 101303655 | 11/2008 |
| CN | 101344864 A | 1/2009 |
| JP | 10-11176 A | 1/1998 |
| JP | 2011-33174 A | 2/2011 |
| JP | 2011-134126 A | 7/2011 |
| TW | 200844859 | 11/2008 |

\* cited by examiner

POWER CONTROL SYSTEM AND METHOD THEREOF

CROSS-REFERENCE TO RELATED APPLICATIONS

This application claims the benefit of the filing date of Taiwan Patent Application No 102124273, filed on Jul. 5, 2013, in the Taiwan Intellectual Property Office, the disclosure of which is incorporated herein in its entirety by reference.

BACKGROUND OF THE INVENTION

Field of the Invention

This disclosure relates to a power control system and a power control method and, more particularly, to a power control system and a power control method which allow the computer system and the power system of a computer device separately stay in different operating modes.

Description of the Related Art

In a common computer device, a central processing unit (CPU) is regarded as the brain of a computer device for processing the core tasks of the computer device. In particular, a clock frequency that the CPU is operating on is an important performance indicator. The higher the clock frequency is, the faster the computer device can process instructions. When manufacturing CPUs in mass production, the CPU suppliers usually guarantee the clock frequency under normal operation in the universal product specification; therefore, the CPU is actually capable of operating normally at a higher clock frequency. As a result, some advanced users will try to use the CPU with a higher clock frequency, or called overclocking, so as for the computer device to reach a better performance. Some CPU suppliers, like Intel, even provide the CPU products with a frequency multiplication-locked type and a frequency multiplication-unlocked type to meet different users' needs.

Please refer to FIG. 1, where FIG. 1 is a block diagram of a computer device in accordance with the prior art. A conventional computer device 100 in accordance with the prior art shown in FIG. 1 includes a computer system 110 and a power system 130. The computer system 110 includes related hardware components required for the operation functions of the operating system (OS) of the computer device 100, where the hardware components may include a CPU, a southbridge chipset, or a northbridge chipset, etc. The power system 130 includes a plurality of voltage regulators for providing one supply voltage to each component of the computer device 100, where the components may include a HD drive, a CD-ROM drive, a display card, or a cooling system. In the conventional computer device 100, the southbridge chipset is responsible for controlling power. According to the standard of the advanced configuration and power interface (ACPI), the operation of a computer device in the aspect of power management can be divided into the following modes.

S0 mode: a normal operation state. In this state, all components of the computer device operate and receive electric power normally.

S1 mode: a first standby state. In this state, the central processing unit (CPU) stops operating, but all other components of the computer device maintain receiving electric power normally.

S2 mode: a second standby state. In this state, the CPU of the computer device powers off, but all other components of the computer device maintain receiving electric power.

S3 mode: a hibernation state. In this state, all components of the computer device stop operating except the memory of the computer device.

S4 mode: a sleep state. In this state, all components of the computer device stop operating after the information in the memory are written into the hard disk or other non-volatile memory devices.

S5 mode: a power-off state. In this state, all components of the computer device stop operating after executing a power-off procedure.

Therefore, when receiving a shutdown signal to enter S5 mode from S0 mode and the operating mode is in S0 mode, the computer system 110 starts to execute the power-off procedure. After the procedure is complete, the southbridge chipset turns off most of the voltage regulators of the power system 130, including the regulators providing supply voltages to the components of the computer device 100 such as the HD drive, the CD-ROM drive, the display card, or the cooling system, and only some few voltage regulators that are required to operate maintain to supply the voltages. For example, in using a power supply complying with ATX standard, after the computer device 100 enters S5 mode, only the set of 5VSB voltage for supplying supply voltages to an embedded controller (EC) is still operating.

However, when the CPU is operated with overclocking frequency, the computer device 100 often spontaneously enters the power-off state and then resumes powering on again. In other words, the computer device 100 switches between the S0 mode and the S5 mode back and forth. This situation causes the components of the computer device 100 such as the HD drive, the CD-ROM drive, the display card, or the cooling system to power off and then power on again frequently. This frequent on-and-off operation shortens the service lifetime of the components of the computer device. In addition, the on-and-off operations in some components such as the operation of motors or fans also cause extra noise.

More importantly, when the CPU is operated with overclocking frequency, the CPU often generates huge heat. The heat dispassion efficiency of the cooling system of the computer device plays an important factor in keeping the whole systems stable and in extending the service lifetime of the components of the computer device. Hence, when the computer device 100 shuts down during the overclocking frequency state, which causes the cooling system to power off, the temperature inside the computer device 100 increases because the cooling system is unable to operate.

Therefore, there is a need to maintain the operation of the cooling system in the computer device during the overclocking frequency state, so as for the computer device 100 to increase the performance and extend the service lifetime of the computer device 100.

SUMMARY OF THE INVENTION

In view of the aforementioned problems, this disclosure provides a power control system and a power control method and, more particularly, to a power control system and a power control method which allow the computer system and the power system of a computer device separately stay in different operating modes.

The power control system is applicable to a computer device. The computer device includes a computer system and a power system. The power system provides supply voltages to the components of the computer device. The power control system is coupled to the computer system and the power system. The power control system includes overclocking frequency mode. When the computer system receives an OFF signal and enters a non-operating state and when the power control system is in the overclocking frequency mode, the power control system sends a SYSTEM-SHUTDOWN signal to the computer system to control the computer system to enter the non-operating state and to control the power system to keep outputting supply voltages.

The power control method is applicable to a computer device. The computer device includes a computer system, a power control system, and a power system. The power control method includes the steps of:

firstly, setting the power control system to be in an overclocking frequency mode;

secondly, instructing the computer device to enter a non-operating state from an operating state and sending an OFF signal to the power control system; and sending a SYSTEM-SHUTDOWN signal so as for the power control system to control the computer system to enter the non-operating state and to control the power system to keep outputting supply voltages.

This disclosure further discloses another power control method. The power control method is applicable to a computer device. The computer device includes a computer system, a power control system, and a power system. The power control system includes an overclocking frequency mode. When the computer device is in an overclocking frequency state, the power control system controls the computer system to stay in a non-operating state and controls the power system to stay in an operating state. The power control method includes the steps of:

firstly, instructing the computer device to be in the non-operating state; instructing the computer device to enter the overclocking frequency state when the computer system receives an ON signal and if the overclocking frequency mode is on and instructing the computer device to enter the operating state when the computer system receives the ON signal and if the overclocking frequency mode is off;

then, instructing the computer device to be in the overclocking frequency state, and instructing the computer device to enter the operating state when the computer system receives an ON signal; and finally, instructing the computer device to be in the operating state, and instructing the computer device to enter the overclocking frequency state when the computer system receives an OFF signal and if the overclocking frequency mode is on and instructing the computer device to enter the non-operating state when the computer system receives the OFF signal and if the overclocking frequency mode is off.

Accordingly, the power control system disclosed in the present invention is configured for intercepting the signals transmitted from the computer system to the power system and processing the signals differently such that the computer system and the power system can separately stay in different operating modes. In this way, the application of the computer device can be more extensive. For example, the situation of frequently powering off and on of the power system accompanied with the computer system can be avoided when the computer system is in the overclocking frequency state, so as for the computer device to extend the service lifetime of the computer device and to maintain the performance of the computer device. Furthermore, the malfunction of hardware of the computer device can also be avoided.

BRIEF DESCRIPTION OF THE DRAWINGS

The present invention will become more fully understood from the detailed description given herein below for illustration only and thus not limitative of the present invention, in which.

DETAILED DESCRIPTION OF THE INVENTION

The term "coupled" is intended to mean either an indirect or direct electrical connection. In other words, the phrase of "a first device is coupled to a second device." disclosed in the specification or the claims section means that the first device is directly electrically connected to the second device, or the first device is indirectly electrically connected to the second device via some other means or devices.

Figure 1:
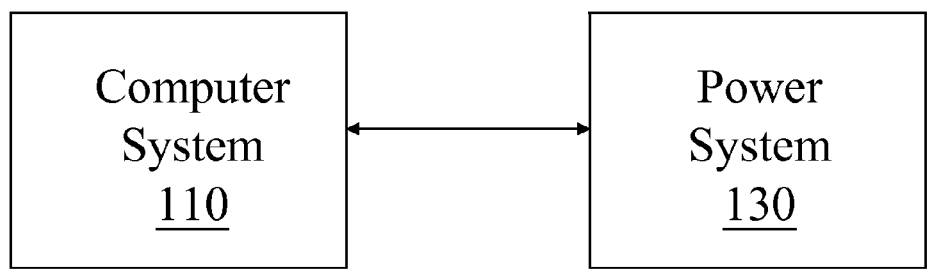
FIG. 1 is a block diagram of a computer device in accordance with the prior art.
Figure 2:
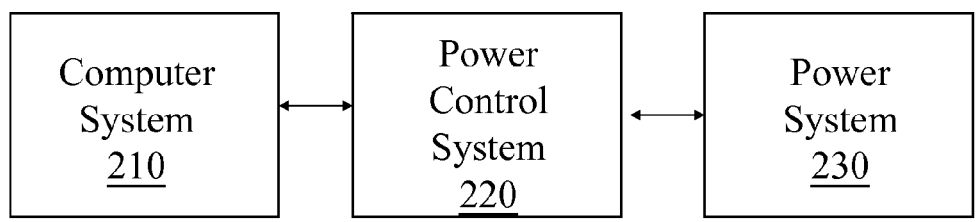
FIG. 2 is a block diagram showing a power control system and the computer device to which the power control system is applied in accordance with a first embodiment of the present invention.

Please firstly refer to FIG. 2, where FIG. 2 is a block diagram showing a power control system and the computer device to which the power control system is applied in accordance with a first embodiment of the present invention. The computer device 200 includes a computer system 210 and a power system 230. The computer system 210 includes essential hardware components required for the operation functions of the operating system (OS) in the computer device 200. Hence, the computer system 210 includes at least one CPU or further includes a southbridge chipset, a northbridge chipset, or other hardware components. It is notable that with the improvement of the technique in semiconductor field, the integrated circuit (IC) has become highly integrated. Therefore, the cross-line to distinguish the function blocks by each unit of the integrated circuit becomes vague. For example, the northbridge chipset, used to be an independent component in computer devices, has been integrated into the CPU to form a single chip. The power system 230 includes a plurality of voltage regulators and control and protection circuits for providing voltage regulators to the components of the computer device 200, such as the HD drive, the CD-ROM drive, the display card, or the cooling system.

The power control system 220 is coupled to the computer system 210 and the power system 230. The power control system 220 includes an overclocking frequency mode. In detail, when the computer system 210 receives an OFF signal and enter a non-operating state, and when the power control system 220 is in the overclocking frequency mode, the power control system 220 sends a SYSTEM-SHUTDOWN signal to the computer system 210 to control the computer system 210 to enter the non-operating state and to control the power system 230 to keep outputting supply voltages.

For example, when The computer device 200 is in the operating state, such as in the state complying with the S0 mode standard of the ACPI, and if the computer system 210 receives an OFF signal to instruct the computer device 200 to enter the S3, S4, or S5 mode described previously, then the power control system 220 also receives an OFF signal from the computer system 210. Next, when the computer system 210 further changes its mode, such as when the computer system 210 shuts down to enter S5 mode, if the overclocking frequency mode of the power control system 220 is on, then the power control system 220 will not send the signals to notify the power system 230 to change mode. In other words, the power control system 220 cut off the signals transmitted from the computer system 210 to the power system 230 so as to keep the power system 230 maintain in the S0 mode to supply power (voltages). In addition, the power control system 220 sends a SYSTEM-SHUTDOWN signal back to the computer system 210 so as for the computer system 210 to consider that the power system 230 has received the OFF signal. After the computer device 200 enters a non-operating state completely such as in the S5 mode, at which time the power system 230 still maintains in its original state to supply voltages, the components of the computer device 200 are able to operate as usual on demand. Therefore, the adverse reduction of the service lifetime of the components of the computer device 200, due to frequent powering on-and-off, can be avoided; furthermore, the noises from powering on the motors or fans of the computer device 200 is also avoided.

Figure 3:
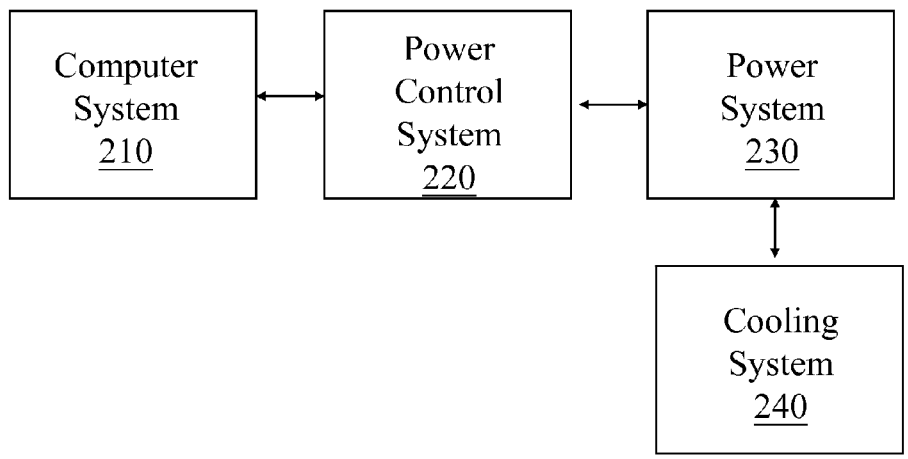
FIG. 3 is a block diagram showing a power control system and the computer device to which the power control system is applied in accordance with a second embodiment of the present invention.

Please now refer to FIG. 3, where FIG. 3 is a block diagram showing a power control system and the computer device to which the power control system is applied in accordance with a second embodiment of the present invention. The difference between the computer device 300 in accordance with the second embodiment and the computer device 200 in accordance with the first embodiment is that the computer device 300 further includes a cooling system 240.

The cooling system 240 is configured to maintain the temperature and the humidity of the working environment under a fixed range for the components of the computer device so as to avoid high temperature that could reduce the service lifetime of the components and affect their performance, and to prevent from vapor condensation and short circuit due to significant change of the temperature.

The characteristics and functions of the computer system 210, the power control system 220, and the power system 230 of the computer device 300 are similar as those in the computer device 200. Please refer to the description and FIG. 2 of the first embodiment for more details. Therefore, the cooling system 240 is able to maintain operation while the computer system 210 is in a non-operating state. For example, the cooling system 240 includes a plurality of fans. The rotation of the fans is able to increase air flow so as to avoid high temperature in the computer device 300 when the computer device 300 re-operate again, and to prevent from vapor condensation once the fans stop running under the low temperature resulted by the cooling system while the CPU are in the overclocking frequency state. The vapor condensation may cause abnormal short circuit of the hardware and thus cause system abnormality.

Figure 4:
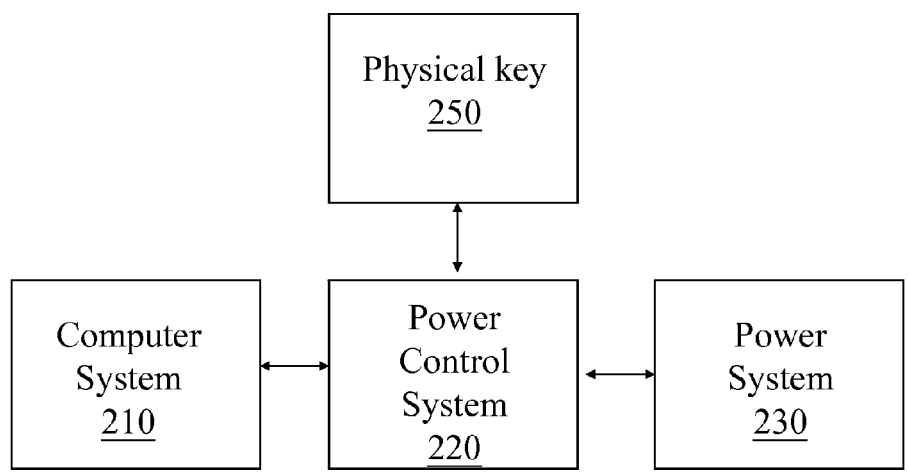
FIG. 4 is a block diagram showing a power control system and the computer device to which the power control system is applied in accordance with a third embodiment of the present invention.

Please further refer to FIG. 4, where FIG. 4 is a block diagram showing a power control system and the computer device to which the power control system is applied in accordance with a third embodiment of the present invention. The difference between the computer device 400 in accordance with the third embodiment and the computer device 200 in accordance with the first embodiment is that the computer device 400 further includes a physical key 250. The physical key 250 is configured for setting the power control system 220 to execute the overclocking frequency mode. For example, after the computer device 400 is initialized, users can press the physical key 250 firstly, and then the power control system 220 executes the overclocking frequency mode. In detail, when the computer system 210 is in non-operating state, the power system 230 maintains supply power, or voltages. Then, users can press the physical key 250 again such that the power control system 220 exits from the overclocking frequency mode. In other words, the computer system 210 and the power system 230 are able to stay in the same operating state or non-operating state simultaneously. The functions in the operating state or non-operating state are the same as the functions of the computer device 100. In addition, the characteristics and functions of the computer system 210, the power control system 220 and the power system 230 of the computer device 400 are similar as those of the computer device 200. Please also refer to the description and FIG. 2 for more details.

Figure 5:
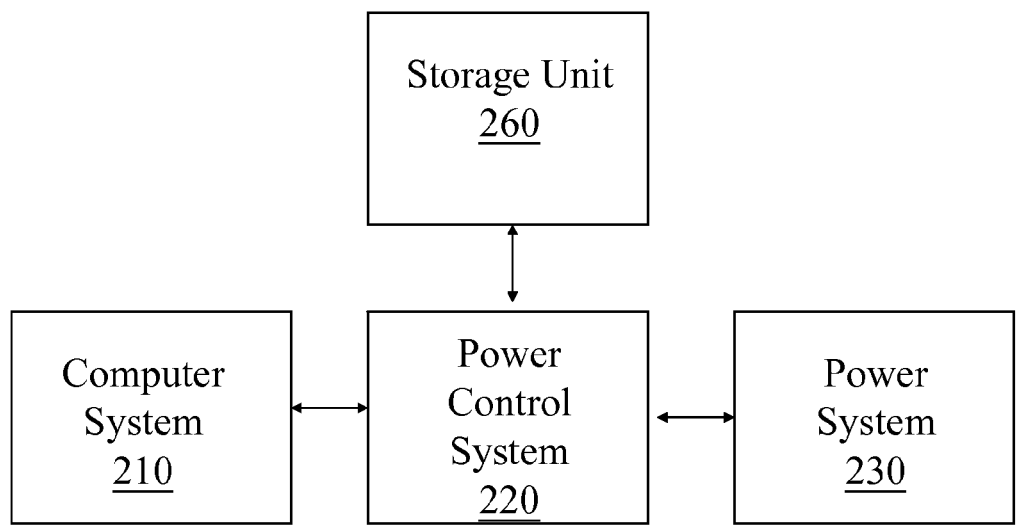
FIG. 5 is a block diagram showing a power control system and the computer device to which the power control system is applied in accordance with a forth embodiment of the present invention.

Please refer to FIG. 5, where FIG. 5 is a block diagram showing a power control system and the computer device to which the power control system is applied in accordance with a forth embodiment of the present invention. The difference between the computer device 500 in accordance with the forth embodiment and the computer device 400 is that the computer device 500 includes a storage unit 260 for setting the power control system 220 to execute the overclocking frequency mode.

In other words, the storage unit 260 has a function of storing predetermined setting values. The power control system 220 can determine whether it should execute the overclocking frequency mode or not by reading one of the setting values stored in the storage unit 260. The state of the storage unit 260 can be changed by the configuration setting of the basic input/output system (BIOS) or the software setting of the OS. The characteristics and functions of the computer system 210, the power control system 220, and the power system 230 of the computer device 500 are similar as those of the computer device 200. Please refer to the FIG. 2 and the related description for more details.

Figure 6:
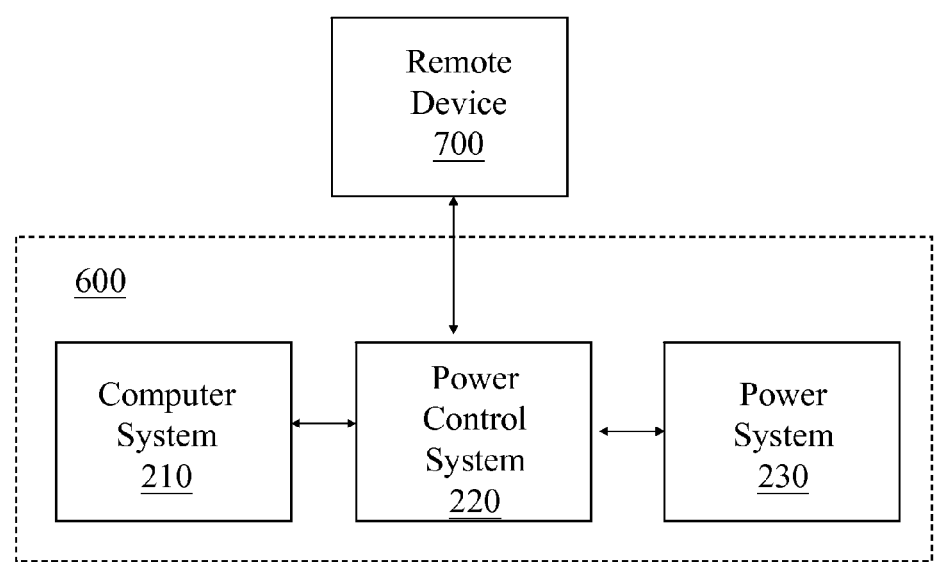
FIG. 6 is a block diagram showing a power control system and the computer device to which the power control system is applied in accordance with a fifth embodiment of the present invention.

Please refer to FIG. 6, FIG. 6 is a block diagram showing a power control system and the computer device to which the power control system is applied in accordance with a fifth embodiment of the present invention. The difference between the computer device 600 and the computer device 400 and the difference between the computer device 600 and the computer device 500 are that the power control system 220 of the computer device 600 is set by a remote device 700 outside the computer device 600 to execute overclocking frequency mode. The remote device 700 can be a server, a personal computer device or a portable electronic device. The remote device 700 can be connected to, but should not be limited to, the computer device 600 via a physical Ethernet or Wi-Fi. The characteristics and functions of the computer system 210, the power control system 220, and the power system 230 of the computer device 600 are similar as those of the computer device 200; please refer to the FIG. 2 and the related description for more details.

Figure 7:
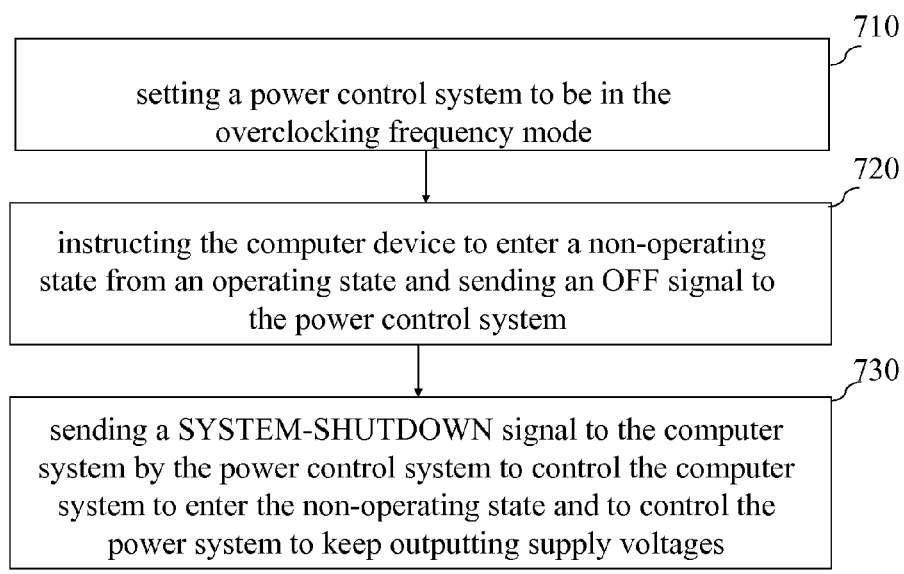
FIG. 7 is a flowchart of a first example of a power control method in accordance with the present invention.

Please refer to FIG. 7, where FIG. 7 is a flowchart of a first example of a power control method in accordance with the present invention. The power control method is applicable to a computer device. The computer device includes a computer system, a power control system, and a power system.

The power control method includes the following steps, which are: setting the power control system to be in the overclocking frequency mode (as shown in step 710); then, instructing the computer device to enter a non-operating state from an operating state and sending an OFF signal to the power control system (as shown in step 720); finally, sending a SYSTEM-SHUTDOWN signal to the computer system by the power control system to control the computer system to enter the non-operating state and to control the power system to keep outputting supply voltages (as shown in step 730).

Figure 8:
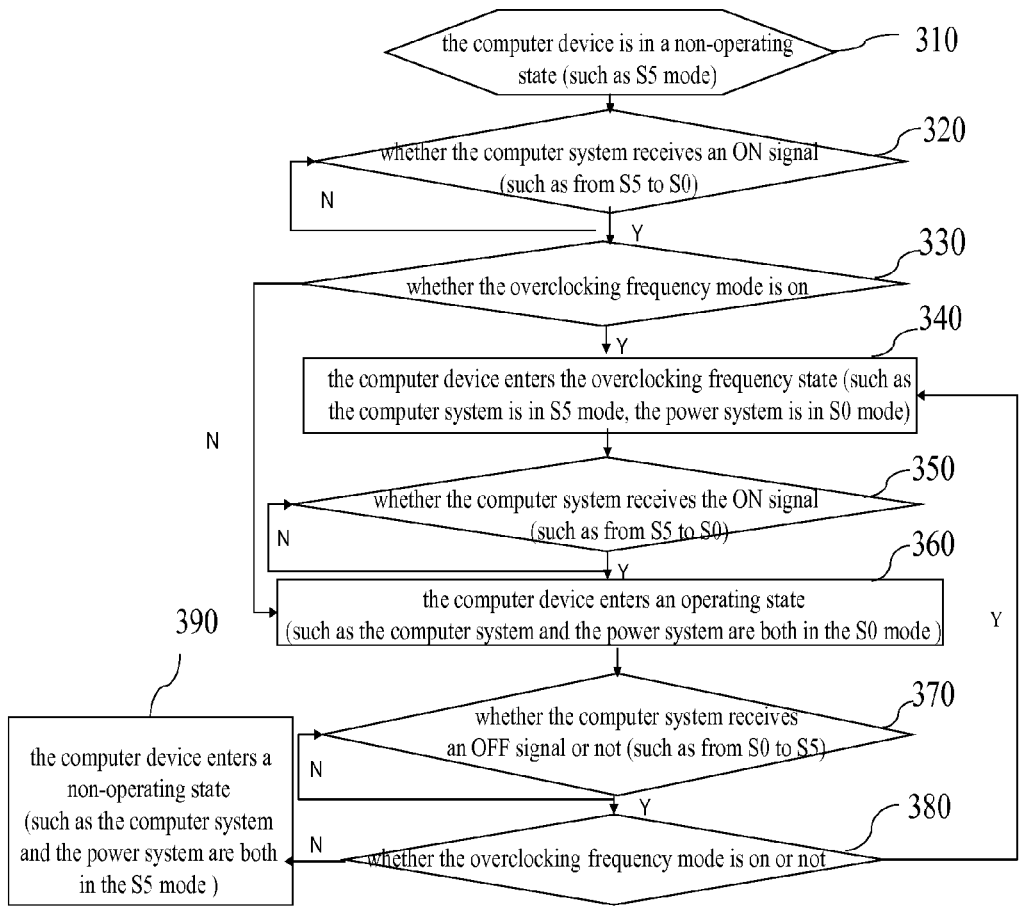
FIG. 8 is a flow chart of a second example of a power control method in accordance with the present invention.

Please further refer to FIG. 8, where FIG. 8 is a flowchart of a second example of a power control method in accordance with the present invention. The power control method disclosed in FIG. 8 is applicable to a computer device. The computer device includes a computer system, a power control system, and a power system. The power control system includes an overclocking frequency mode, and when the computer device is in the over-clock frequency state, the power control system controls the computer system to stay in a non-operating state and controls the power system to stay in an operating state. The power control method includes the steps from step 310 to step 390.

In the step 310, the computer device stays in a non-operating state, which can be the S3, S4 or S5 mode described previously.

In the step 320, the computer system detects whether it receives an ON signal or not. The ON signal is to indicate that the computer device changes from the non-operating state, such as in step 310, to an operating state, such as S0 mode. If the computer system receives an ON signal, then the power control method enters step 330. If the computer system does not receive an ON signal, then the computer system keeps detecting the ON signal.

The step 330 is to determine whether the overclocking frequency mode of the power control system is on or not. If it is on, then the power control method enters step 340, if it is off, then the power control method enters step 360.

In the step 340, the computer device enters the overclocking frequency state. In other words, the computer system stays in the non-operating state, such as S3, S4 or S5 mode described previously. At the same time, the power system is in the operating state such as S0 mode. Then, the power control method enters the step 350.

In the step 350, the computer system detects whether it receives an ON signal or not. If the computer system receives the ON signal, then the power control method enters step 360. If it does not receive an ON signal, then the computer system keeps detecting the ON signal.

In the step 360, the computer device enters an operating state, such as that the computer system and the power system are both in the S0 mode. Then, the power control method enters step 370.

In the step 370, the computer system detects whether it receives an OFF signal or not. The OFF signal is to indicate that the computer device changes from the operating state, such as in step 360, into a non-operating state, such as S5 mode described previously. If the computer system receives the OFF signal, then the power control method enters step 380. If it does not receive the OFF signal, then the computer system keeps detecting the OFF signal.

The step 380 is to determine whether the overclocking frequency mode of the power control system is on or not, if it is on, then enter step 340; if it is off, then the power control method enters step 390.

In the step 390, the computer device enters a non-operating state, such as that the computer system and the power system are both in the S5 mode described previously.

Accordingly, the steps of the power control method in accordance with the present invention can be summarized as follows:

firstly, instructing the computer device to be in an non-operating state, and instructing the computer device to enter an overclocking frequency state when the computer system receives an ON signal and if the overclocking frequency mode is on; instructing the computer device to enter an operating state if the overclocking frequency mode is off;

then, instructing the computer device to be in the overclocking frequency state, and instructing the computer device to enter the operating state when the computer system receives an ON signal;

finally, instructing the computer device to be in the operating state, and instructing the computer device to enter the overclocking frequency state when the computer system receives an OFF signal and if the overclocking frequency mode is on; instructing the computer device enter the non-operating state if the overclocking frequency mode is off.

In addition, in the first example and the second example of the power control methods in accordance with the present invention, the computer device determines whether the power control system is in the overclocking frequency mode or not through a physical key, a switch, configuration setting of the BIOS, or software setting of the OS, or a remote control.

The foregoing description of the exemplary embodiments of the disclosure has been presented only for the purposes of illustration and description and is not intended to be exhaustive or to limit the disclosure to the precise forms disclosed. Many modifications and variations are possible in light of everything above. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope.

Accordingly, the scope of the present disclosure is defined by the appended claims rather than the foregoing description and the exemplary embodiments described therein.

What is claimed is:

1. A power control system applicable to a computer device, the computer device including a computer system and a power system, the power system providing supply voltages to the components of the computer device, the power control system being coupled to the computer system and the power system, the power control system comprising:

an overclocking frequency mode, wherein when the power control system is in the overclocking frequency mode, the computer system is in an overclocking frequency state, wherein when the computer system receives an OFF signal in an operating state and when the power control system is in the overclocking frequency mode, the power control system intercepts the OFF signal transmitted from the computer system to the power system and sends a SYSTEM-SHUTDOWN signal to the computer system so as to control the computer system to enter a non-operating state and to control the power system to stay in the operating state, wherein when the computer system receives the OFF signal in the operating state and when the power control system is not in the overclocking frequency mode, the power control system controls the computer system and the power system both to enter the non-operating state, wherein the non-operating state refers to a state complying with a S3 mode, S4 mode or, S5 mode standard of an advanced configuration and power interface (ACPI), and the operating state refers to that a state complying with a 50 mode standard of the ACPI.

2. The power control system as claimed in claim 1, wherein the computer device further comprises a cooling system coupled to the power system and provided the supply voltage by the power system, and as the power control system stays in the overclocking frequency mode, the supply voltage of the cooling system maintains normal operation.

3. The power control system as claimed in claim 2, wherein the cooling system comprises a plurality of fans.

4. The power control system as claimed in claim 1, wherein the computer device further comprises a physical key for setting the power control system to execute the overclocking frequency mode.

5. The power control system as claimed in claim 1, wherein the computer device further comprises a storage unit, and the state of the storage unit can be changed through either configuration setting of a basic input/output system (BIOS) or software setting of an operation system (OS), and the state of the storage unit is configured for setting the power control system to execute the overclocking frequency mode.

6. The power control system as claimed in claim 1, further comprising a remote device, wherein the remote device is configured to control the power control system remotely so as to set the power control system to execute the overclocking frequency mode.

7. A power control method applicable to a computer device, the computer device including a computer system, a power control system, and a power system, the power control method comprising the steps of:

when the computer system receives an OFF signal in an operating state and when the power control system is in an overclocking frequency mode, intercepting the OFF signal transmitted from the computer system to the power system by the power control system and sending a SYSTEM-SHUTDOWN signal to the computer system by the power control system so as to control the computer system to enter a non-operating state and to control the power system to keep stay in the operating state, wherein when the power control system is in the overclocking frequency mode, the computer system is in an overclocking frequency state; and when the computer system receives the OFF signal in the operating state and when the power control system is not in the overclocking frequency mode, controlling the computer system and the power system to both enter the non-operating state by the power control system, wherein the non-operating state refers to that a state complying with a S3 mode, S4 mode or, S5 mode standard of an advanced configuration and power interface (ACPI), and the operating state refers to that a state complying with a S0 mode standard of the ACPI.

8. The power control method as claimed in claim 7, wherein the computer device uses one of the approaches, a physical key, configuration setting of a basic input/output system (BIOS), software setting of an operating system, and a remote control, to set the power control system to execute the overclocking frequency mode.

9. A power control method applicable to a computer device, the computer device including a computer system, a power control system, and a power system, the power control system including an overclocking frequency mode, wherein when the computer device is in an overclocking frequency state, the power control system controls the computer system to stay in a non-operating state and controls the power system to stay in an operating state, the power control method comprising the steps of:

when the computer system receives the ON signal in the non-operating state and when the power control system is not in the overclocking frequency mode, instructing the computer device to enter the operating state;

when the computer system receives an ON signal in the non-operating state and when the power control system is in the overclocking frequency mode, instructing the computer device to enter the overclocking frequency state;

when the computer system receives the ON signal in the operating state and when the computer device is in the overclocking frequency state, instructing the computer device to enter the operating state;

when the computer system receives an OFF signal in the operating state and when the power control system is in the overclocking frequency mode, instructing the computer device to enter the overclocking frequency state;

when the computer system receives the OFF signal in the operating state and when the power control system is not in the overclocking frequency mode, instructing the computer device to enter the non-operating state, wherein the non-operating state refers to that a state complying with a S3 mode, S4 mode or, S5 mode standard of an advanced configuration and power interface (ACPI), and the operating state refers to that a state complying with a S0 mode standard of the ACPI.

10. The power control method as claimed in claim 9, wherein the computer device uses one of the approaches, a physical key, configuration setting of a basic input/output system (BIOS), software setting of an operation system, and a remote control, to set the power control system to execute the overclocking frequency mode.

* * * * *